(12) United States Patent
Fu

(10) Patent No.: US 9,979,217 B2
(45) Date of Patent: May 22, 2018

(54) ELECTRICAL POWER SUPPLY APPARATUS HAVING SOLAR PANEL AND BATTERY

(71) Applicant: SAS E&P LTD., Calgary (CA)

(72) Inventor: Zhentang Fu, Calgary (CA)

(73) Assignee: SAS E&P LTD., Calgary, Alberta ( * ) Notice: Subject to any disclaimer, the term of this patent is extended or adjusted under 35 U.S.C. 154(b) by 154 days.

(21) Appl. No.: 14/737,734

(22) Filed: Jun. 12, 2015

(65) Prior Publication Data

US 2015/0364942 A1    Dec. 17, 2015

Related U.S. Application Data

(60) Provisional application No. 62/011,682, filed on Jun. 13, 2014.

(51) Int. Cl.
| | |
|---|---|
| *H01M 10/44* | (2006.01) |
| *H02J 7/00* | (2006.01) |
| *H02J 7/35* | (2006.01) |

(52) U.S. Cl.
CPC .......... *H02J 7/0068* (2013.01); *H02J 7/0019* (2013.01); *H02J 7/0042* (2013.01); *H02J 7/35* (2013.01); *H02J 7/0021* (2013.01); *H02J 7/0047* (2013.01)

(58) Field of Classification Search
CPC .................................................. H02J 7/0068
USPC ........................................ 320/101, 117, 126
See application file for complete search history.

(56) References Cited

U.S. PATENT DOCUMENTS

2015/0022140 A1*   1/2015   Heishi ................ H02J 7/34
                                                                        320/101

FOREIGN PATENT DOCUMENTS

| CN | 203119615 | 8/2013 |
|---|---|---|
| TW | 201347353 A | 11/2013 |

OTHER PUBLICATIONS

CA 2,894,075 Examiner's Requisition, Aug. 11, 2016.
SIPO—Chinese Office Action dated May 25, 2017.

* cited by examiner

*Primary Examiner* — Drew A Dunn
*Assistant Examiner* — Zixuan Zhou
(74) *Attorney, Agent, or Firm* — Daniel R. Polonenko

(57) ABSTRACT

An electrical power supply apparatus is disclosed. The apparatus comprises a plurality of rechargeable battery components, a solar panel and a control unit enclosed in a main body and electrically connected to the rechargeable battery components and the solar panel. The control unit controls the apparatus to alternately use each rechargeable battery component for outputting electrical power, and alternately charging each rechargeable battery component using the solar panel. The control unit further comprises an orientation sensor for detecting the orientation of the main body and determining the state of the apparatus based on the signal received from the orientation sensor.

16 Claims, 12 Drawing Sheets

ELECTRICAL POWER SUPPLY APPARATUS HAVING SOLAR PANEL AND BATTERY

FIELD OF THE DISCLOSURE

The present invention is related to an electrical power supply apparatus having solar-panel and batteries, and in particular, a solar-panel and rechargeable battery pack for supplying electrical power to a data acquisition system, and a method for supplying electrical power using a solar panel or rechargeable batteries, and for charging the batteries using the solar panel.

BACKGROUND

In land seismic exploration, wired, wireless and cable-less node acquisition systems, are known having seismic sensors such as geophones, open-loop and closed-loop micro electromechanical systems (MEMS) sensors or the like. These systems are usually deployed in the field, and are powered by batteries.

As many exploration projects can take several months to acquire underground data, recharging and managing the batteries is a burden to users and may incur high cost, related to the need to frequently attend at sites, especially in medium or large size seismic exploration projects. Therefore, there exists a desire for an electrical power supply apparatus to power seismic data acquisition systems in the field with longer periods between recharging or maintenance, or even without the need for manual, on-site recharging or maintenance.

SUMMARY

According to one aspect of this disclosure, there is provided an electrical power supply apparatus for powering electrical power consuming devices such as seismic acquisition systems.

According to another aspect of this disclosure, there is provided an electrical power supply apparatus having rechargeable battery components and a solar panel. The rechargeable battery components may be high density Lithium ion (Li-ion) batteries, which are capable of providing a relatively long power supply period, e.g., during a seismic exploration project, without charging the device during the project or with a minimum number of charging times.

According to another aspect, the solar panel and the Li-ion battery components are combined to provide power to a seismic acquisition system in land seismic exploration. These systems are generally low power users. The solar panel can be the main power source when its output power is sufficient for the seismic acquisition system. When the solar panel is insufficient for powering the seismic acquisition system (due to, e.g., insufficient sunlight), the battery components power the seismic acquisition system. The solar panel charges the battery components when the seismic acquisition system is not in operation or when the solar panel generates more electrical power than what the seismic acquisition system requires.

According to another aspect of this disclosure, there is provided an apparatus for providing electrical power supply via a power output interface. The apparatus comprises: a plurality of rechargeable battery components; and a control unit electrically connected to a power source and to the plurality of rechargeable battery components for alternately outputting electrical power to a load from each of the plurality of rechargeable battery components for a predetermined first period of time such that, at any time, at most one battery component is outputting electrical power; and alternately charging each of the plurality of rechargeable battery components using the power source for a predetermined second period of time, such that, at any time, the power source charges at most one battery component.

In some embodiments, at least one of the plurality of rechargeable battery components, in at least one period of time during operation, only outputs power or is charged.

In some embodiments, each of the plurality of rechargeable battery components outputs power and is charged at the same time.

In some embodiments, said first period of time is different to said second period of time.

In some embodiments, said first period of time equals to said second period of time.

In some embodiments, each battery component comprises only one battery cell.

In some embodiments, at least one battery component comprises a plurality of battery cells; said plurality of battery cells outputting power and being charged as a group. The plurality of battery cells may be electrically connected in parallel, or alternatively electrically connected in serial.

In some embodiments, the apparatus further comprises: a housing, said housing receiving therein the control unit; and wherein the control unit further comprises an orientation sensor for detecting the orientation of said housing, said control unit uses the information of the detected orientation of the housing for enabling the operation of the apparatus if the detected orientation is a predefined first orientation.

The first orientation may be an orientation in which a first wall of the housing is facing downwardly within a predefined first inclination angle.

In some embodiments, the control unit further uses the information of the detected orientation of the housing for turning the apparatus into a sleep mode if the detected orientation is not the first orientation.

In some embodiments, the control unit further uses the information of the detected orientation of the housing for enabling indication of the status of the plurality of rechargeable battery components if the detected orientation is a predefined second orientation; and turning the apparatus into a sleep mode if the detected orientation is neither the first nor the second orientation.

The second orientation may be an orientation in which a second wall of the housing is facing downwardly within a predefined second inclination angle.

In some embodiments, the control unit disables the plurality of rechargeable battery components from outputting power and disables the power source from charging any battery if the detected orientation is the predefined second orientation.

In some embodiments, the control unit disables the plurality of rechargeable battery components from outputting power and disables the power source from charging any battery if the apparatus is in the sleep mode.

In some embodiments, the control unit is still in operation when the apparatus is in the sleep mode.

In some embodiments, the battery is also received in the housing.

The rechargeable battery components may be Li-ion batteries, Nickel Cadmium (NiCd) batteries, Nickel Metal hydride (NiMH) batteries, Lithium ion polymer (Li-ion polymer) batteries, or a combination thereof.

In some embodiments, the housing comprises a safety pressure relief valve for relieving the pressure inside the housing when the pressure therein reaches a predefined pressure threshold.

In some embodiments, the power source is a solar panel.

In some embodiments, the apparatus may further comprise a transparent protection cover for covering the solar panel.

In some embodiments, the solar panel comprise at least one solar panel segment.

In some embodiments, each solar panel segment is couple to an exterior surface of the housing.

In some embodiments, no solar panel segment is facing downwardly when the housing is oriented to the first orientation.

In some embodiments, the transparent protection cover comprises at least the same number of segments as that of the solar panel segments.

In some embodiments, the solar panel is sealed between the housing and the transparent protection cover.

In some embodiments, the power output interface is an electrical cable.

According to another aspect of this disclosure, there is provided a method for providing electrical power supply to a load. The method comprises: alternately outputting electrical power from each of two or more rechargeable battery components for a predetermined first period of time such that, at any time, at most one battery component is outputting electrical power to the load; and alternately charging each of the two or more rechargeable battery components using a power source for a predetermined second period of time, such that, at any time, the power source charges at most one of the two or more rechargeable battery components.

In some embodiments, said alternately charging each of the two or more rechargeable battery components comprises: for at least one of the two or more rechargeable battery components, charging the battery component using a power source for the predetermined second period of time while the battery component is not outputting power.

In some embodiments, said alternately charging each of the two or more rechargeable battery components comprises: for each of the two or more rechargeable battery components, charging the battery component using a power source for the predetermined second period of time while the battery component is outputting power.

In some embodiments, said first period of time is different to said second period of time.

In some embodiments, said first period of time equals to said second period of time.

In some embodiments, wherein each battery component comprises only one battery cell.

In some embodiments, at least one battery component comprises a plurality of battery cells; said plurality of battery cells outputting power and being charged as a group.

In some embodiments, said a plurality of battery cells are electrically connected in parallel.

In some embodiments, said a plurality of battery cells are electrically connected in serial.

In some embodiments, the method further comprises: receiving the control unit in a housing; detecting the orientation of said housing using an orientation sensor; and enabling the operation of the apparatus if the detected orientation is a predefined first orientation.

In some embodiments, said first orientation is an orientation in which a first wall of the housing is facing downwardly within a predefined first inclination angle.

In some embodiments, the method further comprises: turning the apparatus into a sleep mode if the detected orientation is not the first orientation.

In some embodiments, the method further comprises: enabling indication of the status of the rechargeable battery components if the detected orientation is a predefined second orientation; and turning the apparatus into a sleep mode if the detected orientation is neither the first nor the second orientation.

In some embodiments, said second orientation is an orientation in which a second wall of the housing is facing downwardly within a predefined second inclination angle.

In some embodiments, the method further comprises: disabling the two or more rechargeable battery components from outputting power and disabling the power source from charging any of the two or more rechargeable battery components if the detected orientation is the predefined second orientation.

In some embodiments, said turning the apparatus into a sleep mode comprises: disabling the two or more rechargeable battery components from outputting power; and disabling the power source from charging any of the two or more rechargeable battery components.

In some embodiments, said turning the apparatus into a sleep mode comprises: maintaining the control unit in operation; and disabling other components of the apparatus.

In some embodiments, the method further comprises: receiving the two or more rechargeable battery components in the housing.

In some embodiments, said rechargeable battery components are Li-ion batteries, Nickel Cadmium (NiCd) batteries, Nickel Metal hydride (NiMH) batteries, Lithium ion polymer (Li-ion polymer) batteries, or a combination thereof.

In some embodiments, the method further comprises: relieving the pressure inside the housing using a safety pressure relief valve on the housing, when the pressure in the housing reaches a predefined pressure threshold.

In some embodiments, the power source is a solar panel.

In some embodiments, the method further comprises: covering the solar panel using a transparent protection cover.

In some embodiments, the solar panel comprise at least one solar panel segment.

In some embodiments, the method further comprises: coupling each solar panel segment to an exterior surface of the housing.

In some embodiments, no solar panel segment is facing downwardly when the housing is oriented to the first orientation.

In some embodiments, the transparent protection cover comprises at least the same number of segments as that of the solar panel segments.

In some embodiments, the method further comprises: sealing the solar panel between the housing and the transparent protection cover.

In some embodiments, said alternately outputting electrical power from each of two or more rechargeable battery components comprises: alternately outputting electrical power via an electrical cable from each of the two or more rechargeable battery components for a predetermined first period of time.

According to another aspect of this disclosure, there is provided an electrical power supply apparatus for providing electrical power supply via a power output interface, comprising: a solar panel; a battery having at least one battery component; and a control unit electrically connected to the solar panel and the battery for monitoring the output of the solar panel; using the battery as the source for supplying electrical power if the output of the solar panel is smaller than a first threshold; and using the solar panel as the source for supplying electrical power if the output of the solar panel is larger than the first threshold.

DETAILED DESCRIPTION

Figure 1:
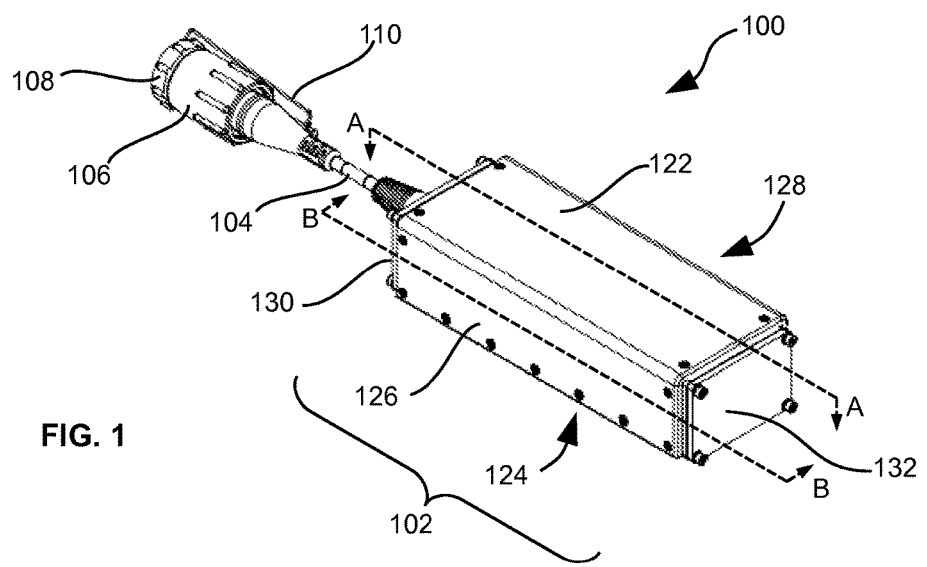
FIG. 1 is a perspective view of an electrical power supply apparatus viewing from the back thereof.
Figure 2:
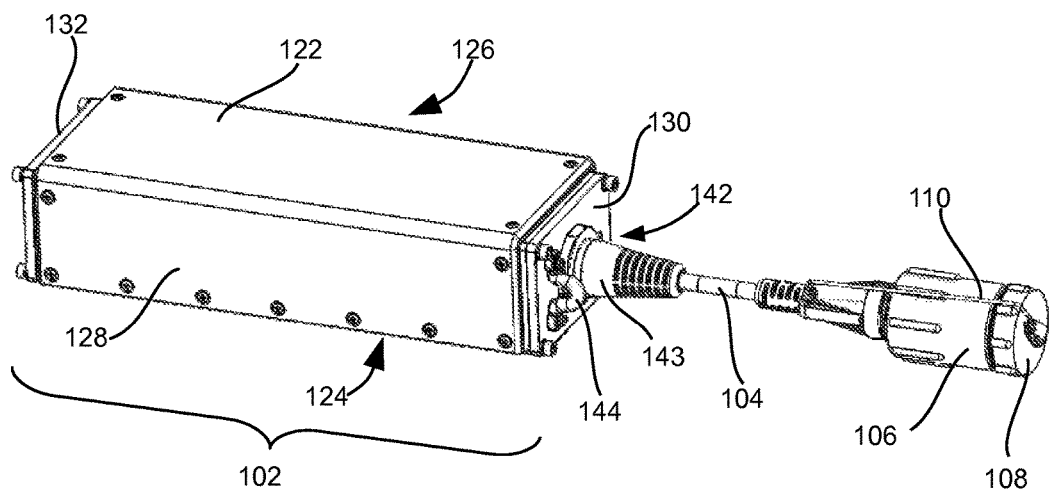
FIG. 2 is a perspective view of the electrical power supply apparatus of FIG. 1, viewing from the front thereof.
Figure 3:
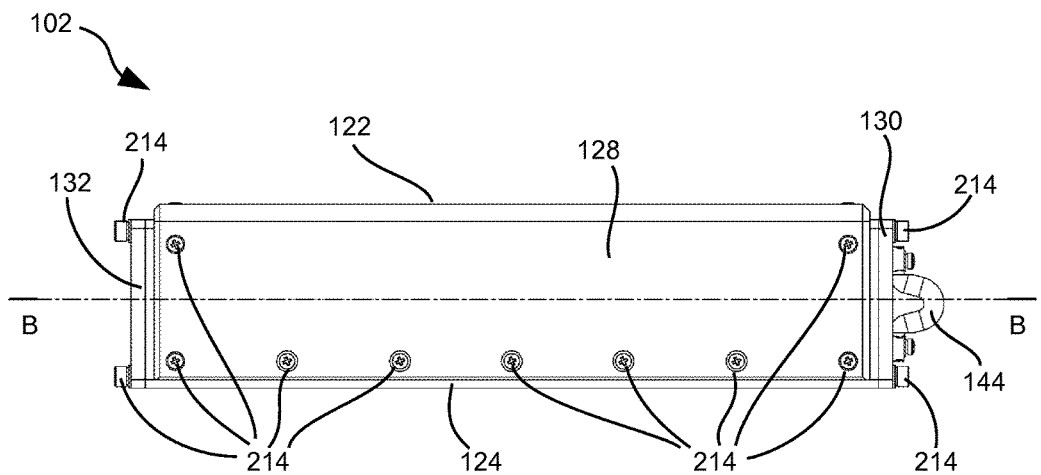
FIG. 3 is a side view of the main body of the electrical power supply apparatus of FIG. 1.

Turning to FIGS. 1, 2 and 3, according to one embodiment, an electrical power supply apparatus 100 is shown. In this embodiment, the apparatus 100 is a solar-panel Lithium ion (Li-ion) battery pack for providing electrical power to a seismic acquisition system (not shown) such as a geophone system. The apparatus 100 is hardened for field use. As shown, the electrical power supply apparatus 100 comprises a main body 102 coupled to an electrical cable 104, which comprises an electrical connector 106 for powering a load or a power-consumption device. The electrical cable 104 comprises mutually electrically-insulated, electrically conductive wires. Two wires are used for outputting electrical power to a device or load connected to the power supply apparatus 100. Accordingly, in some alternative embodiments, the electrical cable 104 comprises two mutually electrically-insulated, electrically conductive wires.

A protection cap 108 covers the end of the electrical connector 106 when the electrical power supply apparatus 100 is unused, and is taken off therefrom to allow the electrical connector 106 to receive an electrical plug of an electrical power-receiving device such as a geophone or a geophone control box. A string 110 ties the protection cap 108 to the electrical connector 106 to retain the protection cap 108 to the apparatus 100 when the connector 106 is coupled to a load.

The main body 102 in this embodiment comprises a cuboid housing having a top wall 122, a bottom wall 124, two side walls 126 and 128, a front cover 130 and a back cover 132. The front and back covers 130 and 132 are sealably and removably coupled to the main body 102 via suitable fasteners such as screws 214. The front cover 130 comprises an opening 142 for receiving the cable 104, a convenience hook 144 and a safety valve (not shown) for managing the pressure inside the main body 102. The front cover 130 also include a battery condition display (not shown).

Figure 4:
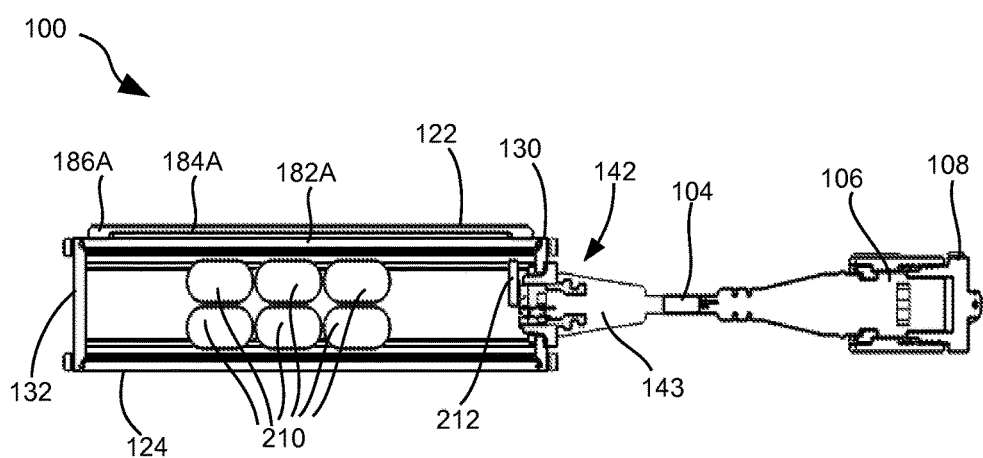
FIG. 4 is a cross-sectional view of the electrical power supply apparatus of FIG. 1 along section A-A.
Figure 5:
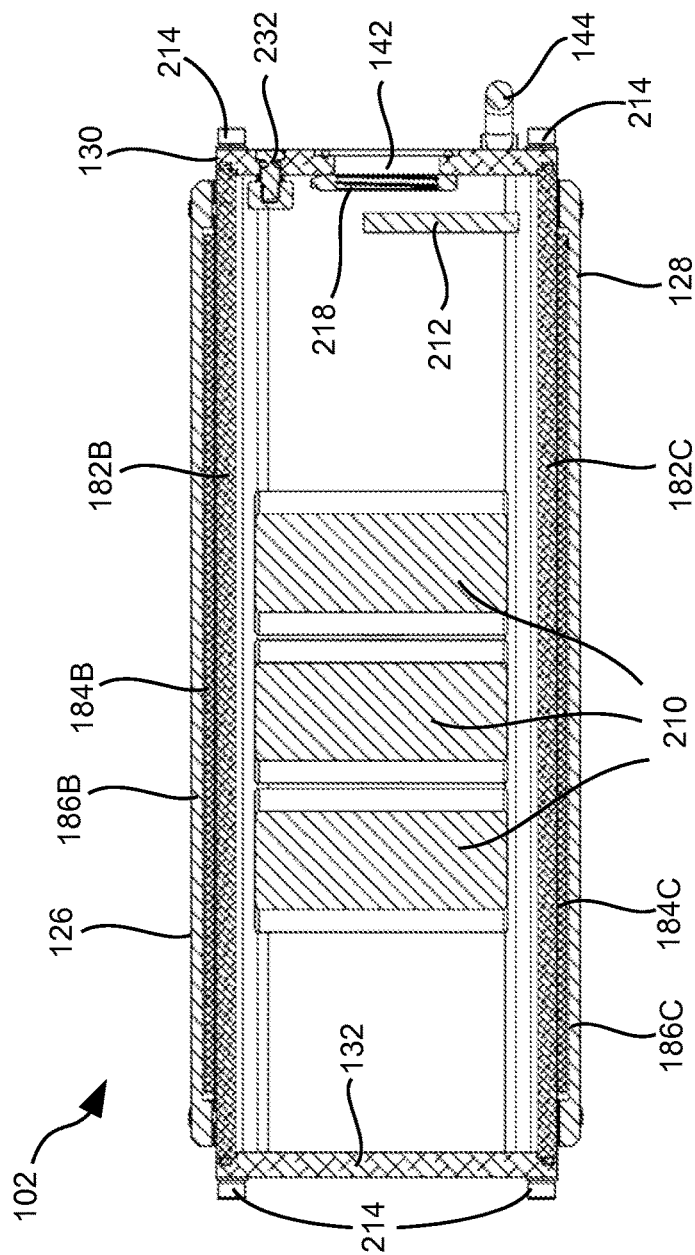
FIG. 5 is a cross-sectional view of the main body of the electrical power supply apparatus of FIG. 1 along section B-B.

Referring to FIGS. 4 and 5, the bottom wall 124, the front cover 130 and the back cover 132 are made of a rigid material such as aluminum, steel or the like to provide sufficient mechanical protection to the components therein. The top wall 122 comprises a plurality of layers, including a structural layer 182A made of a rigid material such as aluminum, steel or the like to provide sufficient mechanical protection to the components therein, a transparent protection cover segment 186A on top of the structural layer 182A, and a solar panel segment 184A sealably sandwiched between the structural layer 182A and the transparent protection cover segment 186A.

Similarly, the side wall 126 (or 128) also comprises a plurality of layers, including a structural layer 182B (or 182C) made of a rigid material such as aluminum, steel or the like to provide sufficient mechanical protection to the components therein, a transparent protection cover segment 186B (or 186C) on top of the structural layer 182B (or 182C), and a solar panel cover segment 184B (or 184C) sealably sandwiched between the structural layer 182B (or 182C) and the transparent protection cover segment 186B (or 186C).

When assembled, the walls 122, 124, 126, 128, 130 and 132 of the main body 102 forms a weather-protected interior space for receiving therein a battery comprising N battery components 210, where N≥1 is an integer representing the number of battery components, and a control unit 212 in the form of a printed circuit board (PCB). In this embodiment, the power supply apparatus comprises six (6) Li-ion battery cells, i.e., N=6, which are arranged in a two-by-three (2x3) array of two layers with each layer having three battery cells.

The solar panel layer 184 and the battery components 210 are electrically connected to the control unit 212, which is in turn electrically connected to the cable 104 through the opening 142 on the front cover 130. As shown in FIG. 5, the opening 142 comprises a threaded portion 218 for threadably receiving a threaded connector 143 of the cable 104.

Due to the variation of the environmental temperature, the pressure of the interior space of the main body 102 may vary. An increase in pressure can be problematic to the battery components 210 and the main body 102. In this embodiment, the battery components 210 are generally known to be capable of resisting a pressure up to 22 kilogram-force per square centimeter ($kgf/cm^2$) while maintaining their normal working condition within acceptable specifications. However, to prevent the pressure inside the main body 102 from exceeding the safety limit and causing hazard to the battery components 210.

Figure 6A:
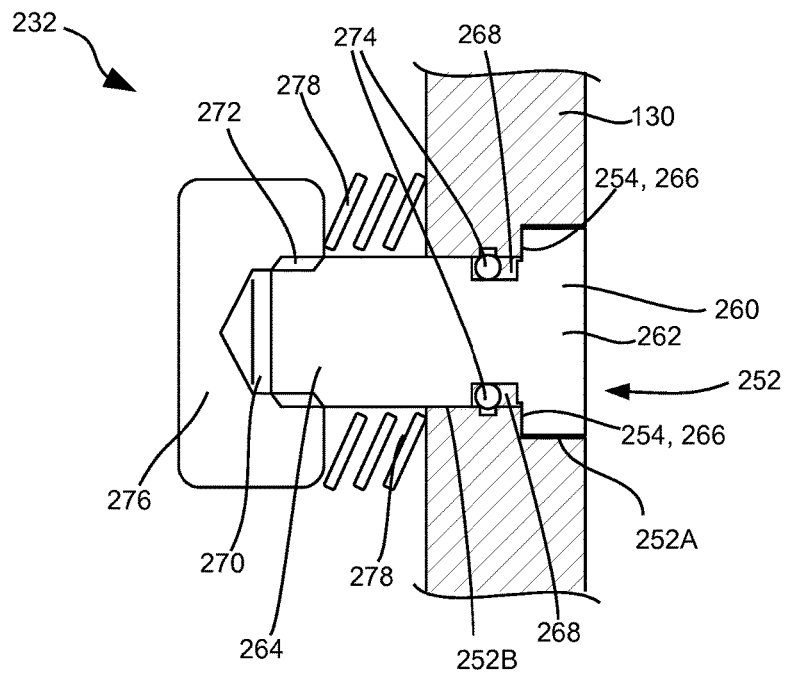
FIGS. 6A and 6B show the detail of the safety pressure relief valve.
Figure 6B:
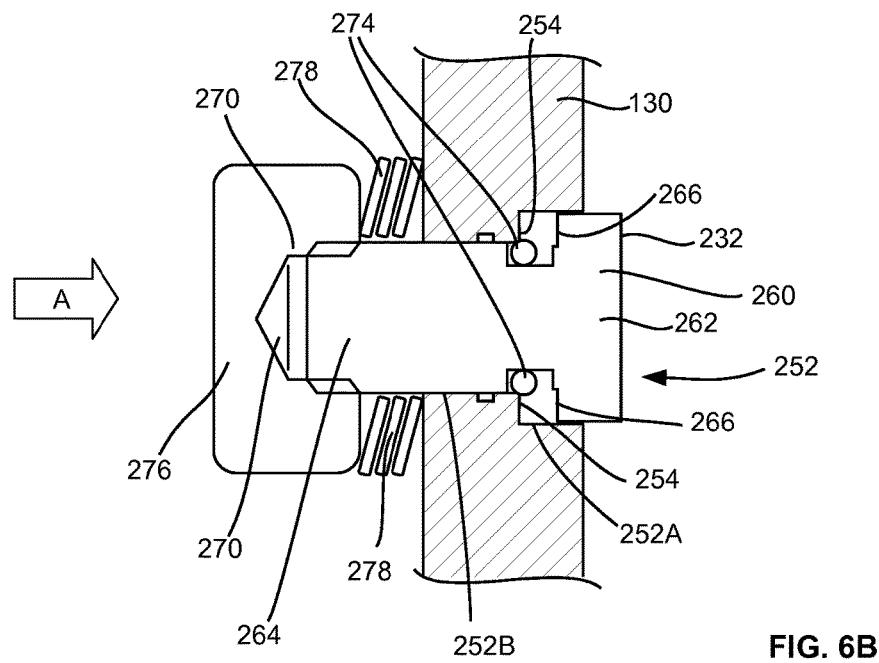

As shown in FIGS. 6A and 6B, the main body 102 further comprises a one-way safety pressure relief valve 232 on the front cover 130. The safety pressure relief valve 232 can relieve the pressure when the pressure inside the main body 102 reaches about 22 kgf/cm$^2$. As shown in FIG. 6A, the valve 232 comprises an opening 252 on the front cover 130 for receiving an insert 260. The opening 252 comprises a first cylindrical portion 252A and a concentric, second cylindrical portion 252B with the diameter of the first cylindrical portion 252A being larger than that of the second cylindrical portion 252B. A radial stop 254 is thus formed between the first and second cylindrical portions 252A and 252B.

The insert 260 comprises a cylindrical base 262, and a shaft 264 extending from the center thereof. The diameter of the base 262 is larger than that of the shaft 264 such that the edge of the base 262 forms a radial shoulder 266 matching the radial stop 254 of the opening 252. The diameter of the base 262 is smaller than that of the first cylindrical portion 252A of the opening 252 such that a gap is formed between the base 262 and the first cylindrical portion 252A when the insert 260 is received into the opening 252.

The shaft 264 comprises a groove 268 on its outer surface near the base 262 for accommodating an O-ring 274. The distal end 270 of the shaft 264 has threads 272 for a nut 276 to screw on.

When assembled, an O-ring 274 is placed in the groove 268 of the insert 260, and the insert 260 is received in the opening 252 with the shoulder 266 in contact with the stop 254. A wave spring 278 is then placed on the inner surface of the front cover 130 around the shaft 264 of the insert 260, and a nut 276 is screwed onto the shaft 264 via the threads 272 thereof. The nut 276 slightly compresses the spring 278. While the pressure in the main body 102 is at about the normal air pressure, e.g., the standard atmospheric pressure of 1.0 bar, the spring 278 presses the insert 260 in the opening 252 against the stop 254. The O-ring 274 seals the gap between the opening 252 and the inset 260.

As shown in FIG. 6B, when the pressure A in the main body 102 increases, the air pressure A overcomes the resist of the spring 278 and pushes the nut 276 and the insert 260 outwardly. When the air pressure A in the main body 102 exceeds the designed safety limit, the air pressure A forces the insert 260 to a leak position, such as a position in which the O-ring 274 is forced into the first portion 252A of the opening 252, and no longer seals the gap between the opening 252 and the inset 260. As a result, the pressurized air in the main body 102 escapes out of the main body 192 via the gap between the opening 252 and the inset 260, and the pressure in the main body is therefore lowered.

Figure 7:
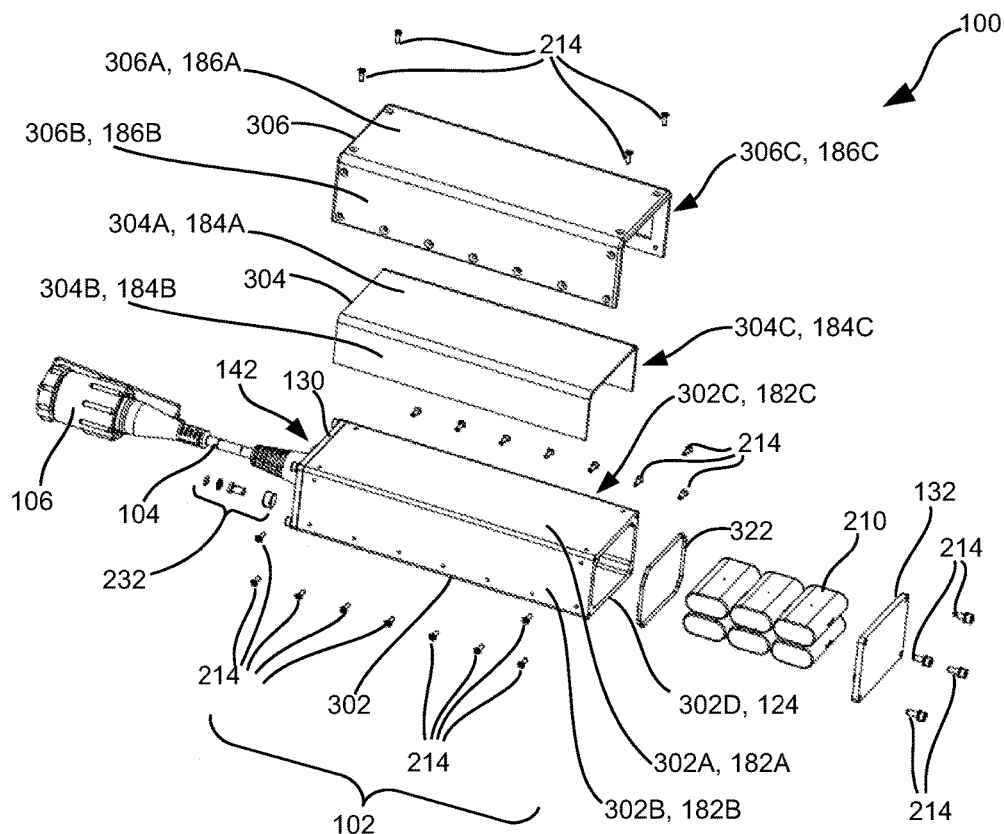
FIG. 7 is an exploded perspective view of the electrical power supply apparatus of FIG. 1.

As shown in FIG. 7, in manufacturing, a hollow rectangular parallelepiped or housing 302 having four walls 302A to 302D is used for manufacturing the main body 102. The four walls 302A to 302D form the structural layer 182A of the top wall 122, the structural layers 182B and 182C of the side walls 126 and 128, and the bottom wall 124, respectively. As described above, the housing 302 is made of a rigid material such as aluminum, steel or the like to provide sufficient mechanical protection to the components therein.

To form the solar panel layers 184A to 184C, a solar panel 304 having three panel segments 304A to 304C is used, with the side segments 304A and 304C folded downwardly to each form a right angle with respect to the middle segment 304B. Similarly, the transparent protection layers 186A to 186C are formed by a transparent protection cover 306 having three covering segments 306A to 306C, with the side segments 306A and 306C folded downwardly to each form a right angle with respect to the middle segment 306B. In this embodiment, the transparent protection cover is made of a transparent, and preferably non-fragile, material such as acrylic glass, transparent plastic, toughened glass or the like.

Therefore, in this embodiment, three sides 122, 126 and 128 of the main body 102 are capable of converting solar power to electrical power.

Figure 8:
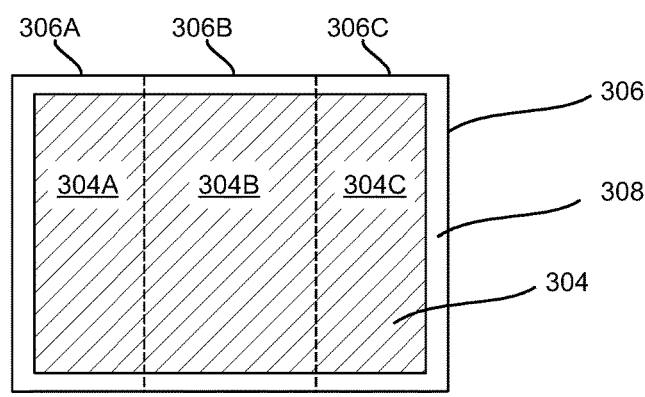
FIG. 8 shows the transparent protection cover and the solar panel in an imaginary unfolded configuration.

As shown in FIG. 8, if unfolded, the solar panel 304 and the transparent protection cover 306 are in a rectangular shape. The segments 306A to 306C of the transparent protection cover 306 have dimensions matching those of the walls 302A to 302C of the housing 302, respectively. The dimension of the solar panel 304 is however smaller than that of the transparent protection cover 306. When assembled, the solar panel 304 is positioned underneath transparent protection cover 306 and glued or otherwise coupled thereto. A seal element 308 is used to seal the edge of the transparent protection cover 306 so as to prevent water from contacting the solar panel 304.

Referring back to FIG. 7, after coupling the solar panel 304 to the transparent protection cover 306, the transparent protection cover 306 is attached to the housing 302 and is fastened thereon by a plurality of screws 214. Those skilled in the art appreciate that other fastening means, such as gluing, wielding or the like, may also be used to attach the transparent protection cover 304 to the housing 302.

After attaching the transparent protection cover 304 to the housing 302, the solar panel 304 is electrically wired to the control unit (not shown). The battery components 210 are also wired to the control unit. The control unit and the battery components 210 are then inserted into the housing 302.

The back cover 132 is then coupled to the rear end of the housing 302, and fastened thereon using screws 214. An O-ring 322 is also sandwiched between the housing 302 and the back cover 310 to seal the contact interface between the housing 302 and the back cover 312. Similarly, the front cover 130 is coupled to the front end of the housing 302, and fastened thereon using screws 214. An O-ring (not shown) is sandwiched between the housing 302 and the front cover 310 to seal the contact interface between the housing 302 and the front cover 310.

The control unit is electrically connected to the cable 104, and the cable 104 is then threaded into the opening 142 on the front cover 130.

In this embodiment, the battery components 210 are one power source for the power-consumption devices connected to the apparatus 100 via the cable 104 and the electrical connector 106. The solar panel 304 converts sunlight into electricity for charging the battery components 210. Under the control of the control unit 212, each battery component 210 is sequentially or alternately connected to the output of the apparatus 100 for outputting electrical power to the power-consumption devices connected thereto. That is, only one battery component 210 outputs power at a time. Similarly, under the control of the control unit 212, the solar panel 304 sequentially or alternately charges each battery component 210, and only one battery component 210 is charged by the solar panel 304 at a time.

Figure 9A:
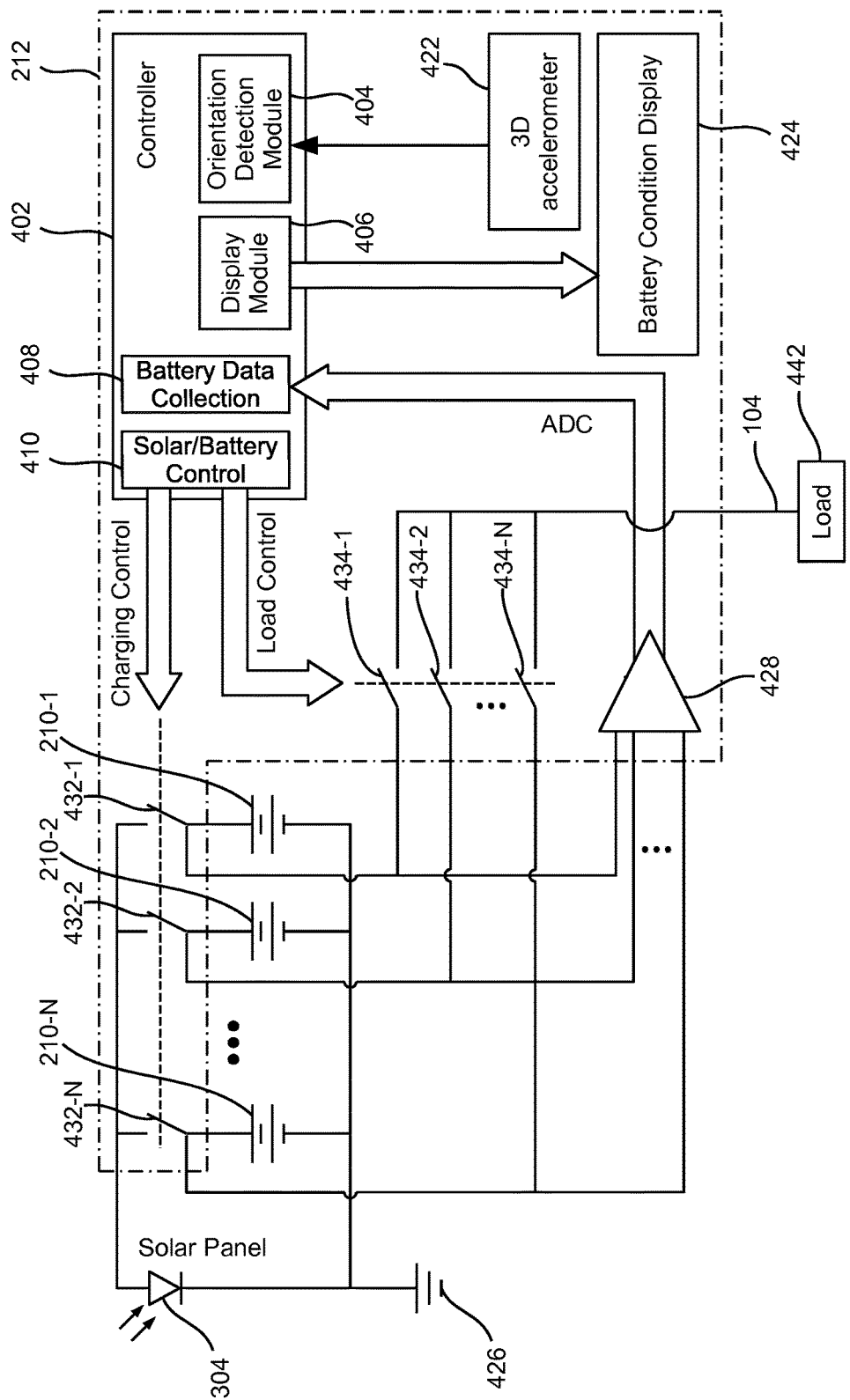
FIG. 9A is a circuit diagram of the apparatus of FIG. 1.

FIG. 9A shows a circuit diagram of the apparatus 100. As shown, the apparatus 100 comprises a plurality of components, including a control unit 212, a plurality of battery components 210-1 to 210-N, a solar panel 304, and a power output interface such as the electrical cable 104. In this figure, the symbol indicated by the reference numeral 426 is the common ground, which is well known in the art.

The control unit 212 comprises a controller 402 having a display module 406, a battery data collection module 408, a solar panel/battery control module 410 and an orientation detection module 404.

The orientation detection module 404 is connected to an orientation detector 422 such as a three-dimensional (3D) accelerometer for detecting the orientation of the main body 102. The display module 406 is connected to a battery condition display 424, which in this embodiment comprise a plurality of LED lights, for outputting the status of battery components to users. The battery data collection module 408 received digital data from an analog-to-digital converter 428, which is connected to the N battery components 210-1 to 210-N, for collecting the analog battery voltage information thereof, and converting it to digital format. The controller 402 uses the collected battery voltage information to generate signals for display module 406 to output to the battery condition display 424.

The solar panel/battery control module 410 of the controller 402 controls N charging switches 432-1 to 432-N, each of which connects the solar panel 304 to a respective battery component 210-1 to 201-N. The solar panel/battery control module 410 of the controller 402 also controls N output switches 434-1 to 434-N, each of which connects a respective battery component 210-1 to 201-N via the electrical cable 104 to the power consumption device or the load 442.

In this embodiment, the operation of the power supply apparatus 100 starts when the apparatus 100 is assembled. After start, the orientation detection module 404 is first powered on. The orientation detection module 404 is always powered on and monitors the orientation of the main body 102. Based on the determination of the orientation of the main body 102, the orientation detection module 404 enables various modules to execute various functions, or putting the apparatus 100 into a sleep mode in certain conditions (described below). Herein, when the apparatus 100 is in the sleep mode, all components thereof are powered off and disabled except that the orientation detection module 404 is still powered on and in operation for monitoring the orientation of the main body 102.

In this embodiments, the controller 404 stores a predefined upright orientation, which is defined as the orientation of the main body 102 at which the bottom wall 124 is generally horizontally oriented and facing downwardly with an inclination angle (with respect to a horizontal plane) smaller than about 30°. The upright orientation is an optimal orientation for the solar panel to absorb sunlight in that, compared with other orientations, placing the apparatus in its upright orientation allows the solar panel to face the sunlight in most of the daytime. The controller 404 also stores a predefined vertical orientation, which is defined as the orientation of the main body 102 at which the front cover 130 (or the back cover 132) is generally horizontally oriented with an inclination angle smaller than 30°. As will be described in more detail later, the upright orientation triggers the power-on of the apparatus 100, i.e., the apparatus 100 in an operation mode enabling the operation thereof, the vertical orientation triggers the display of battery status, and any other orientation shuts off the apparatus 100 (except the orientation detection module 404, as described above).

Figure 9B:
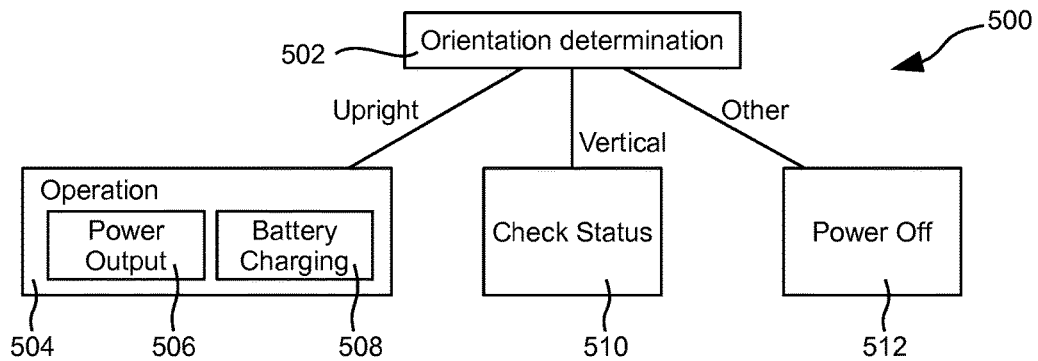
FIG. 9B is a functional structure diagram of the apparatus of FIG. 1.

FIG. 9B shows the functional structure 500 of the power supply apparatus 100. As shown, the functional structure 500 comprises an orientation determination function 502 performed by the orientation detection module 404 for continuously monitoring the orientation of the main body 102. The orientation determination function 502 has a higher priority than other functions, and the detected orientation determines the status or operation of other functions.

If the orientation determination function 502 determines that the orientation of the main body 102 is upright, the orientation detection module 404 instructs the apparatus 100 to enter into an operation mode 504, enabling the operation of the apparatus 100, by turning on the power of the rest of the control unit 212, enabling a power output function 506, and a battery charging function 508.

Figure 9C:
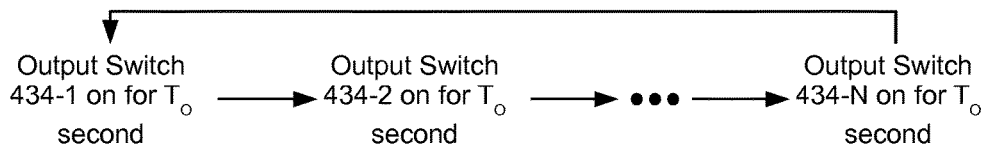
FIGS. 9C and 9D illustrate the power outputting and charging loops, respectively, of the battery components of the apparatus of FIG. 1.

The power output function 506 is performed by the N battery components 210-1 to 210-N through the output switches 434-1 to 434-N and the electrical cable 104, and is controlled by the solar panel/battery control module 410 of the controller 402. The solar panel/battery control module 410 sequentially or alternately, according to a predefined order, turns on each of the output switches 434-1 to 434-N for a predefined time period $T_O$. Herein, the term "turning on a switch" means that the switch is closed to allow electrical current to pass therethrough, and the term "turning off a switch" means that the switch is open to disallow electrical current to pass therethrough. While an output switch is turned on, other output switches are turned off. For example, as shown in FIG. 9C, the solar panel/battery control module 410 first turns on the output switch 434-1 for $T_O$ seconds to output power from the battery component 210-1 while turning other output switches off. Then, the solar panel/battery control module 410 turns on the output switch 434-2 for $T_O$ seconds to output power from the battery component 210-2 while turning other output switches off. The solar panel/battery control module 410 then turns on the next output switch. After the N-th output switch 434-N has been turned on for $T_O$ seconds, the process loops back, and the solar panel/battery control module 410 turns on the first output switch 434-1 again for $T_O$ seconds.

In this manner, only one output switch is turned on at a time for $T_O$ seconds. When the i-th output switch, where N≥i≥1, is turned on, the respective battery component 210-$i$ is electrically connected to the cable 104 for outputting electrical power to the load 442 for a predefined time period $T_O$. The battery components are therefore alternately used for outputting electrical power. One benefit of alternately using each battery component as electrical power output is to avoid the risk of overheating.

Figure 9D:
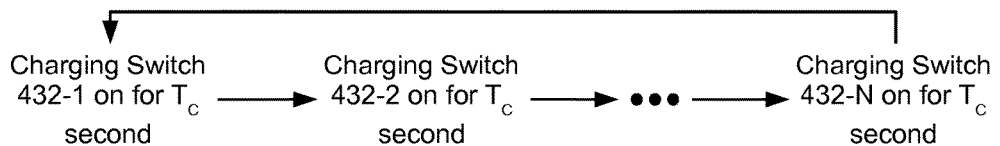

Similarly, the battery charging function 508 is performed by the solar panel 304 and the N battery components 210-1 to 210-N through the charging switches 432-1 to 432-N, and is controlled by the solar panel/battery control module 410 of the controller 402. The solar panel/battery control module 410 sequentially or alternately, according to a predefined order, turns on each of the charging switches 432-1 to 432-N for a predefined time period $T_C$. While a charging switch is turned on, other charging switches are turned off. For example, as shown in FIG. 9D, the solar panel/battery control module 410 first turns on the charging switch 432-1 on for $T_C$ seconds while turning other charging switches off. Then, the solar panel/battery control module 410 turns the charging switch 432-2 on and other charging switches off for $T_C$ seconds. The solar panel/battery control module 410 then turns on the next charging switch. After the N-th charging switch 432-N has been turned on for $T_C$ seconds, the process loops back, and the solar panel/battery control module 410 turns on the first charging switch 432-1 again for $T_C$ seconds.

In this manner, only one charging switch is turned on at a time for $T_C$ seconds. When the i-th charging switch, where N≥i≥1, is turned on, the solar panel 304 is electrically connected to the respective battery component 210-$i$ for charging it a predefined time period $T_C$. The battery components are therefore alternately charged without the risk of overheating.

The power output and battery charging functions 506 and 508 can be performed by respective circuitries in parallel. In this embodiment, $T_O=T_C=2$ seconds, and the power output and battery charging functions 506 and 508 starts the power outputting and charging loops, respectively, from the same battery component. Thus, each battery component always simultaneously or synchronously outputs power and is charged, i.e., outputting power while being charged at the same time. As the solar panel 304 is also connected to the load 442, it also outputs power thereto (provided that the solar panel 304 has sufficient power output).

A difference between the apparatus 100 disclosed herein and conventional solar panel/battery power supply devices is in the way the N battery components are electrically connected. In conventional solar panel/battery power supply devices, the battery components are all electrically connected, e.g., in parallel. A large capacity solar panel is therefore required to charge all battery components at the same time. Moreover, battery components in conventional devices each having variable characteristics may drain out power from each other. That is, if a battery component has electricity energy (usually in the form of stored chemical energy) less than that of other battery components, other battery components having more energy would preferentially charge the battery component with low electricity energy through the electrical wiring therebetween, which may exhaust the battery components having more energy. In some instances, this arrangement may trigger a large current and cause risks such as overheating.

However, in the apparatus 100, the N battery components are not electrically connected to each other at the same time. Therefore, a solar panel with a capacity merely sufficient for charging one battery component may be used, avoiding the requirement of a solar panel with a large capacity sufficient for charging all battery components simultaneously. Also, as the N battery components are not electrically connected to each other at the same time, a battery component having electrical energy lower than other battery components would not drain electricity from other battery components.

Referring back to FIG. 9B, if the orientation determination function 502 determines that the main body 102 is in the vertical orientation, the orientation detection module 404 instructs the apparatus 100 into a check-status mode by enabling the check-status function 510. This normally occurs when a user is checking the condition of the battery components, in which situation the user opens the main body 102, orients the main body 102 to the vertical orientation, and observes the indication on the battery condition display 424.

Figure 10:
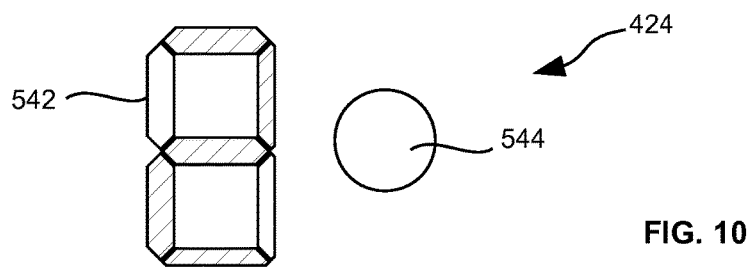
FIG. 10 shows the battery condition display of the apparatus of FIG. 1.

In the vertical orientation, the controller 402 uses the battery voltage information collected by the battery data collection module 408 to generate battery status information, which is sent to the display module 406 for displaying battery status via the battery condition display 424. As shown in FIG. 10, in this embodiment, the battery condition display 424 comprises a seven-segment LED display 542 periodically displaying number 1 to N with each number being displayed for a predefined period of time $T_D$, e.g., 2 seconds, indicating the 1st to the N-th battery component, respectively. The battery condition display 424 also comprises a multi-color LED light 544 for indicating the condition of the battery component indicated by the seven-segment LED display 542. In particular, the LED light 544 emitting green light indicates that the respective battery component is fully charged, the LED light 544 emitting amber light indicates that the respective battery component is not fully charged, and the LED light 544 emitting red light indicates that the respective battery component is dead, i.e., having insufficient power output and no longer chargeable. A user can then replace the dead battery component.

When the main body 102 is in the vertical orientation, and the check-status function 510 is enabled, the operation function 504 is disabled, turning off all charging switches 432-1 to 432-N and all output switches 434-1 to 434-N. However, in an alternative embodiment, the operation function 504 may be enabled and the apparatus 100 is operating as described above when the check-status function 510 is enabled.

Referring back to FIG. 9B, if the orientation determination function 502 determines that the main body 102 is neither in the upright orientation nor in the vertical orientation, the orientation detection module 404 then instructs the apparatus 100 to enter into a sleep mode by maintaining itself powered-on and powering off other components of the apparatus 100. In particular, when entering the sleep mode, the charging switches 432-1 to 432-N and all output switches 434-1 to 434-N are turned off to disable the battery components from outputting power. The solar panel is disabled to prevent from charging the battery components, and all components of the control unit 212, except the orientation detection module 404, are disabled and powered off.

The apparatus 100 thus automatically turns itself on and off depending on its orientation, which may be beneficial for, e.g., use and transportation. For example, during transportation, a user may put one or more apparatus 100 in a container in an "upside down" orientation, i.e., the bottom wall facing up. Each of the apparatuses 100 detects that it is not in the upright or vertical orientation, and automatically enters the sleep mode to ensure safe transportation by rendering the power output off, avoiding the risk of short-circuiting the battery components. When the user puts an apparatus 100 on a surface, e.g., the ground, in its upright orientation, the apparatus 100 then automatically enters the operation mode and supplies electrical power to the devices connected thereto.

The apparatus 100 may automatically enter the sleep mode if the apparatus 100 was turned into a non-upright, non-vertical orientation by an unpredicted external force, such as by dropping or jarring and interference by an animal. When such a situation occurs, a non-optimal orientation can occur and a significant portion of the solar panel 304 is usually not facing the sunlight. The apparatus automatically enter the sleep mode to avoid electrical hazard, and to prevent the battery components from draining out.

Those skilled in the art appreciate that, the flowchart of FIG. 9B is only an example for illustrating the operation of the apparatus 100. Other methods may be used in alternative embodiments. For example, in one alternative embodiment, the control unit 212 may monitor the orientation of the main body 102 using the interrupt mechanism. More specifically, the control unit 212 does not periodically check the orientation of main body 102. Rather, the orientation sensor generates an orientation interrupt to the control unit 212 whenever the orientation of the main body 102 is set to the upright, vertical or non-upright-non-vertical orientation by an external force such as a user, an animal, wind, gravity or the like. The control unit 212 then instructs the apparatus 100 into the operation, check-status or sleep mode according to the interrupt received from the orientation sensor.

Figure 11A:
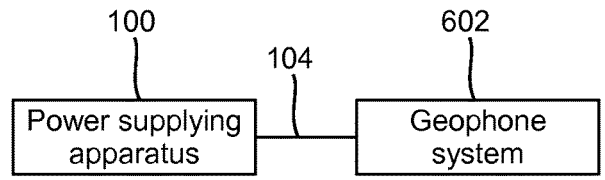
FIGS. 11A to 11C illustrate various power supply configurations.
Figure 11B:
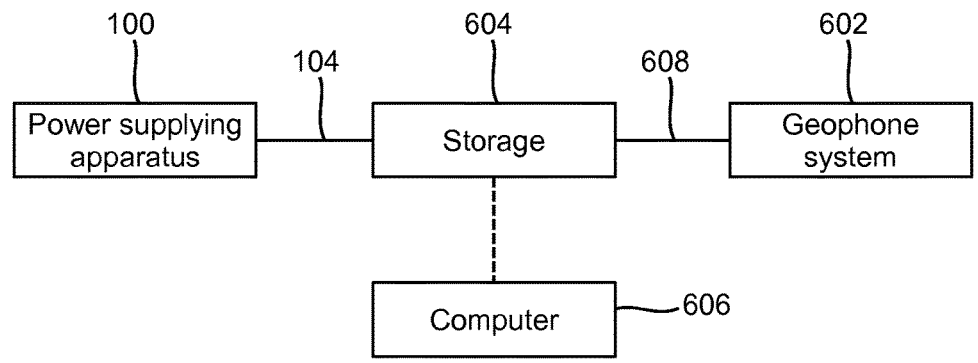
Figure 11C:
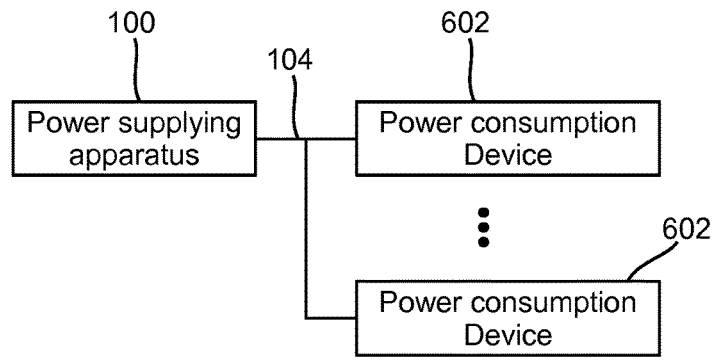

The electrical power supply apparatus 100 described herein may be used for powering a variety of devices and in a variety of configurations. FIGS. 11A to 11C illustrate some examples. In FIG. 11A, an electrical power consumption device 602, such as a geophone system, is electrically connected to the electrical power supply apparatus 100 via a cable 104 to receive electrical power therefrom. Of course, those skilled in the art appreciate that the electrical power consumption device 602 may alternatively be other suitable devices.

In FIG. 11B, the electrical power supply apparatus 100 is connected to a plurality of electrical power consumption devices 604 and 602 in serial. As shown, the electrical power supply apparatus 100 is connected to a storage device 604 via a cable 104 to supply power thereto. The storage device 604 is in turn connected to a a geophone system 602 via a similar cable 608 to communicate with the geophone system 602 and also supply thereto the electrical power received from the electrical power supply apparatus 100. Therefore, both the storage device 604 and the geophone system 602 are powered by the electrical power supply apparatus 100. The storage device 604 in this configuration stores the data collected by the geophone system. The storage device 604 may also communicate with a computing device 606, via suitable wired or wireless communication means, to send collected data thereto or to receive commands therefrom.

Although not shown in this figure, one or more power consumption devices may be further connected in serial to the second power consumption device 602. Those skilled in the art appreciate that, alternatively, the electrical power supply apparatus 100 may be connected to other electrical power consumption devices in serial for outputting power thereto in a similar manner.

Shown in FIG. 11C, in an alternative configuration, the power supply device 100 comprises an electrical cable 104 having one end coupled to the main body 102 and electrically connected to the control unit 212, and having a plurality of branches on the other end, connecting to a plurality of power consumption devices 602 for outputting power thereto. In this configuration, the power consumption devices are connected to the power supply device 100 in parallel.

Figure 12:
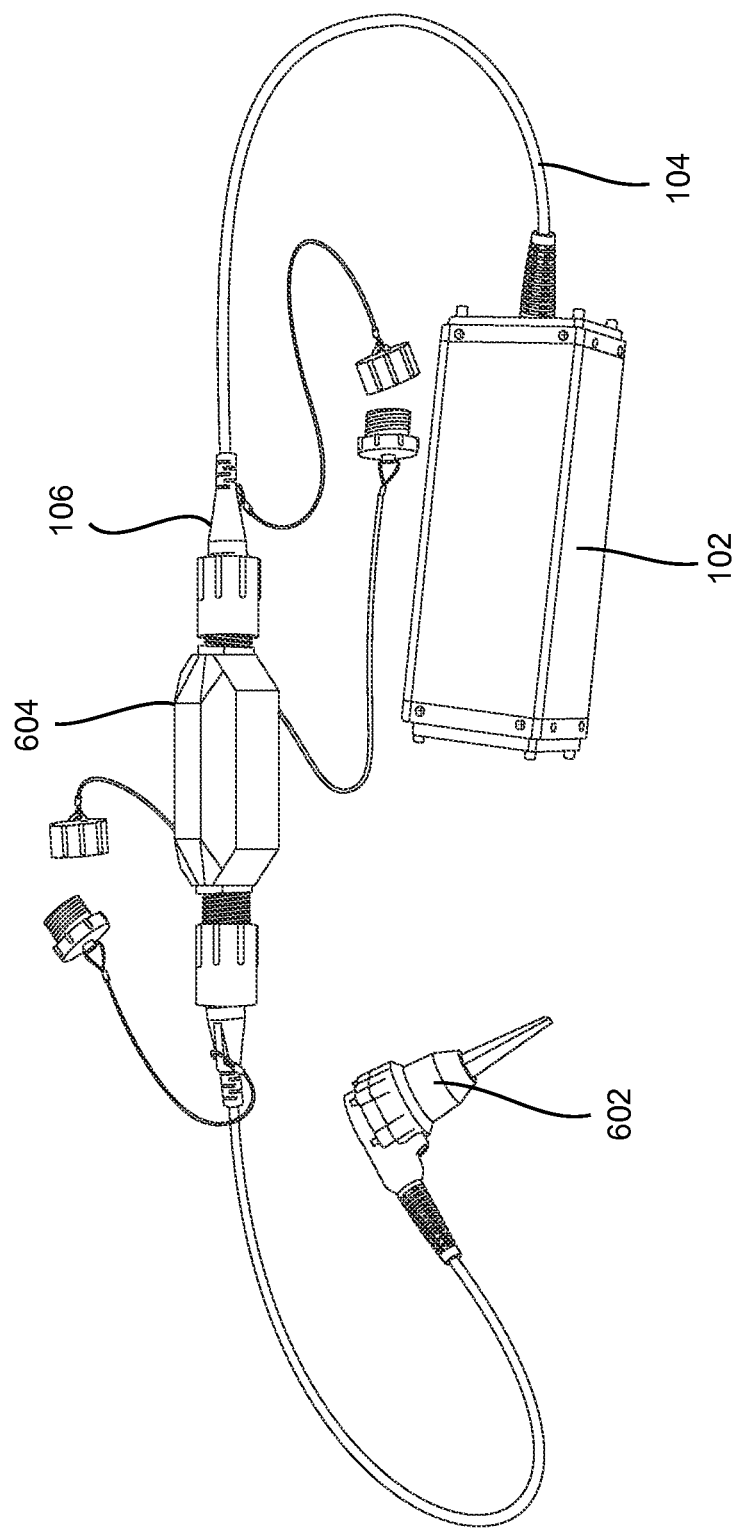
FIG. 12 shows an arrangement of the electrical power supply apparatus of FIG. 1, a storage device and a geophone system.

FIG. 12 shows an arrangement of the electrical power supply apparatus 100, a storage device 604 and a geophone system 602 as provided in the configuration of FIG. 11B. In this example, the battery components 210 are Li-ion battery cells having a total capacity of 97 watt·hour with maximum output voltage of 4.2V. When used as the power source for conventional geophone systems, a one-day battery charge is sufficient for at least 10 day's use while the solar panel 304 is not in operation (due to, e.g., malfunction or insufficient sunlight).

In an alternative embodiment, the front and back covers 130 and 132 of the main body 102 are also covered with solar panel segments.

In some other embodiments, the main body 102 may have other suitable shapes such as semi-spherical, conical or frustum shapes with a defined upright and operational orientation.

In an alternative embodiment, the apparatus 100 comprises an indicator, such as an LED display, on the main body 102, electrically connected to the control unit 212 for indicating the operation state of the apparatus 100. For example, light-off indicates that the apparatus 100 is in the sleep mode, a green light indicates that the apparatus 100 is in the operation mode and outputting power. In another embodiment, the apparatus 100 may not comprise a battery status indicator.

Figure 13A:
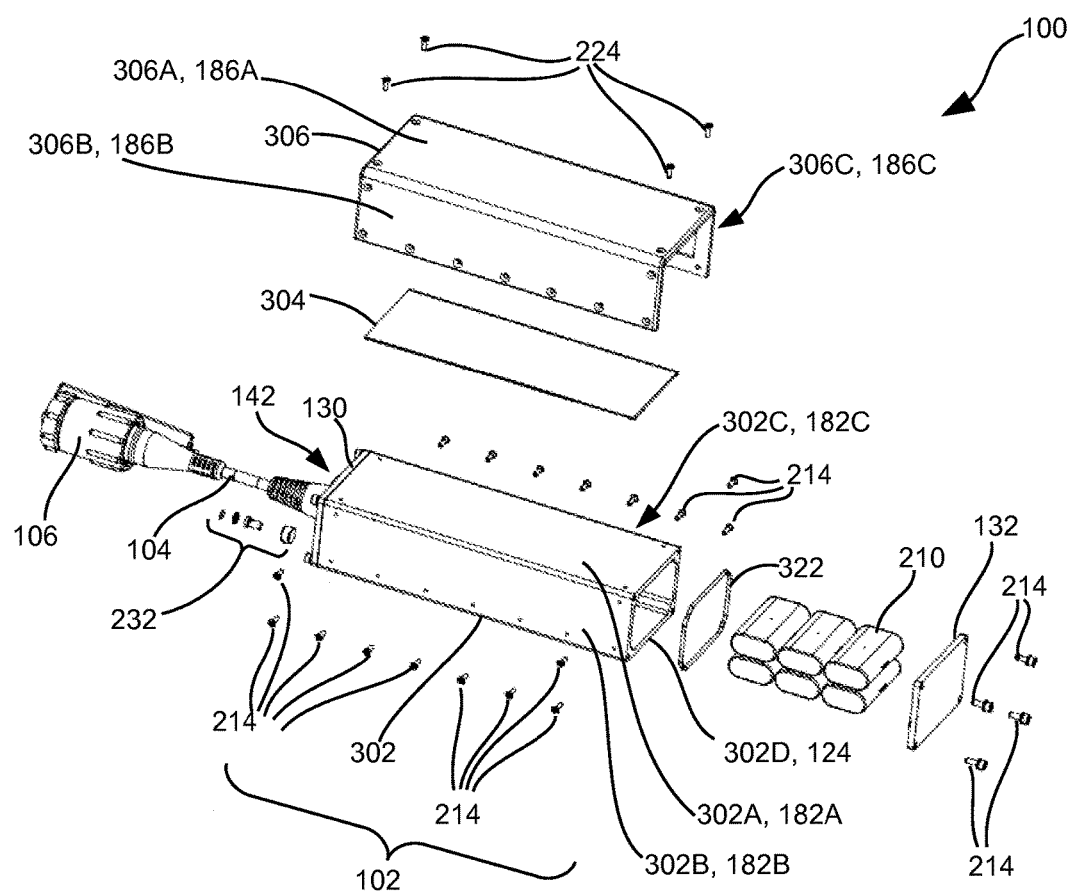
FIGS. 13A to 13C show the electrical power supply apparatus and a load according to some alternative embodiments.

Those skilled in the art appreciate that in various embodiments, the solar panel 304 may comprise a different number of segments. For example, as shown in FIG. 13A, in one embodiment, the solar panel may only comprise a single segment 304 coupled to the top wall 122 of the main body 102.

In some other embodiments, the solar panel 304 may not be coupled to the main body 102. For example, in one embodiment, the solar panel 304 is a stand-alone device connecting to the control unit 212 via an electrical cable. In these embodiments, the main body 102 only encloses the battery components 210 and the control unit 212.

Figure 13B:
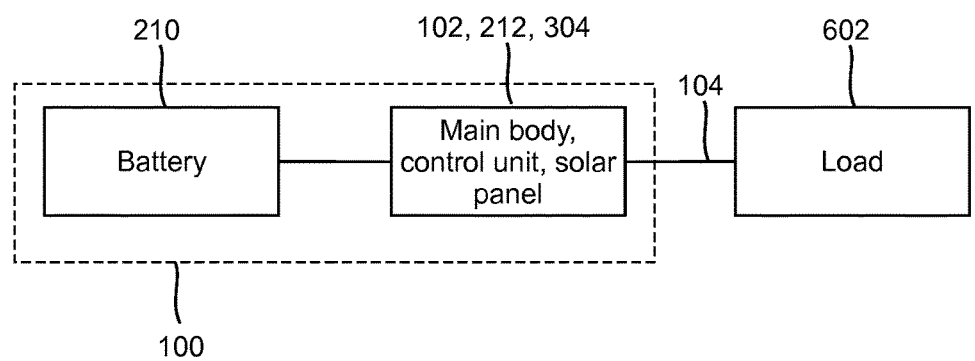
Figure 13C:
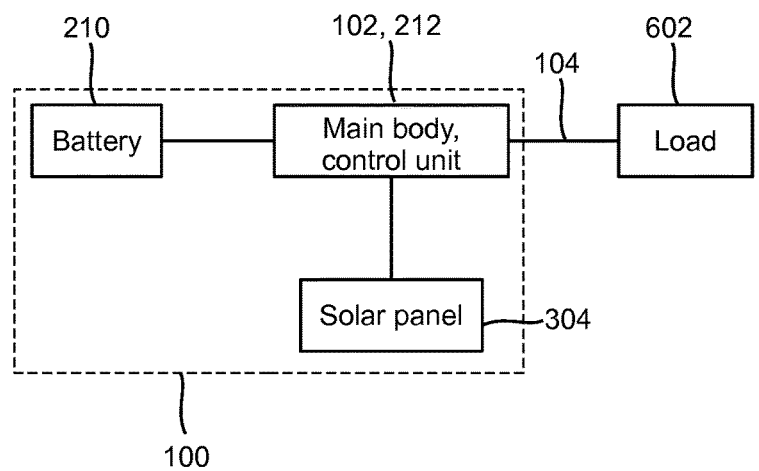

In some other embodiments, the battery components 210 may not be enclosed in the main body 102. For example, in one embodiment, the main body 102 encloses the control unit 212. The battery components 210 are enclosed in a separate housing, and are electrically connected to the control unit 212. The solar panel 304 may be attached on one or more walls of the main body 102 (FIG. 13B), or alternatively, is configured as a stand-alone device (FIG. 13C). As described before, the solar panel 304 is electrically connected to the main body 102 and in turn connected to the battery 210.

In still another embodiment, the apparatus does not have any display module 406 nor any battery condition display 424. Accordingly, the apparatus 100 does not have a check-status state, nor any check status function 510. Moreover, the apparatus 100 does not store or monitor a vertical orientation either, and only comprises an operation mode and a sleep mode. In this embodiment, the orientation determination module 404 automatically instructs the apparatus 100 to enter the operation mode, i.e., enabling the operation function 504, if the main body 102 is in the upright orientation, and to enter the sleep mode if the main body 102 is not in the upright orientation.

In some other embodiments, the apparatus 100 may further comprise a main power switch for users to manually turning on/off the apparatus 100, including the orientation detection module 404. In another embodiment, the apparatus 100 comprises a main power switch but does not comprise any orientation sensor. A user has to manually turn on/off the apparatus 100.

In above embodiment, the power output time period $T_O$ and battery component charging time period $T_C$ are set to the same length of time, and the power output and battery charging functions 506 and 508 start the power outputting and charging loops, respectively, from the same battery component at the same time such that each battery component always outputs power while being charged at the same time. However, those skilled in the art appreciate that, in alternative embodiments, $T_O$ and $T_C$ may be set to different lengths of time, and/or the power output and battery charging functions 506 and 508 may start the power outputting and charging loops, respectively, from different battery components and/or from different starting time. Consequently, a battery component need not, or even never, simultaneously output power and be charged. At least one battery component, in at least some time period during operation, outputs power without being charged, or is charged without outputting power. For example, in an alternative embodiment, $T_O$ and $T_C$ are set to the same length of time but the power output and battery charging functions 506 and 508 may start the power outputting and charging loops, respectively, from different battery components such that no battery component outputs power and is charged at the same time.

In above embodiment, each battery component comprises only one battery cell. Herein, a battery cell is a separate battery entity having a positive terminal (also called "cathode"), a negative terminal (also called "anode") and a body between the positive and negative terminals and comprise therein chemical composite suitable for converting stored chemical energy into electrical energy via chemical reactions. The battery components are generally rechargeable battery components of any suitable types, such as, but not limited to, Nickel Cadmium (NiCd) batteries, Nickel Metal hydride (NiMH) batteries, Li-ion batteries, Lithium ion polymer (Li-ion polymer) batteries, and the like. In some embodiments, lead-acid batteries and/or fuel batteries may also be used.

In prior art devices mixing use of batteries of different types and/or brands is generally not recommended, as the mixed batteries may drain out power from each other due to their different properties, e.g., different output voltages, capacities, and the like. Compared to prior art devices, the apparatus disclosed herein has an advantage that it allows the use of battery components of different types and/or brands. As each battery component alternately and individually powers the load or is charged, power draining out from each other is thus prevented.

In some alternative embodiments, at least one battery component comprises a plurality of battery cells, electrically connected in serial or alternatively electrically connected in parallel, and are used for outputting power and being charged as a group. Preferably, the battery cells in the same battery components have similar properties, which, in practice, may be loosely ensured by using battery cells with the same type and/or brand. Testing may be required to meet a higher battery property similarity requirement. Due to the difficulty of finding battery cells with high similarity, it may be preferable to use fewer battery cells in a battery component than to use more battery cells therein.

Figure 14:
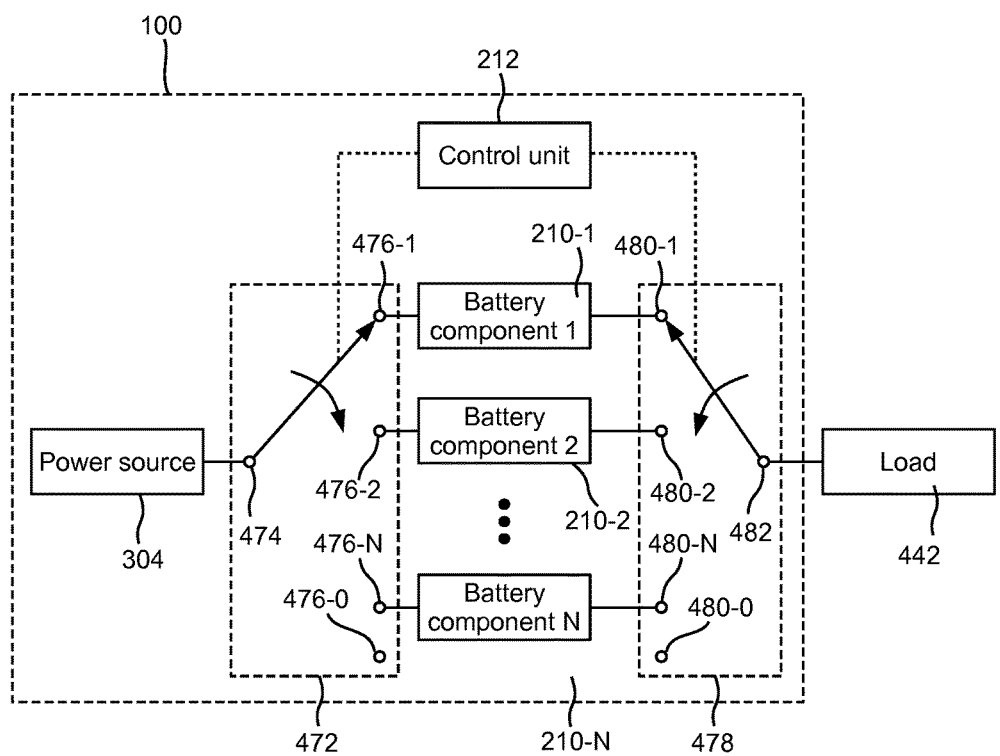
FIG. 14 is a simplified diagram of the electrical power supply apparatus according to some an alternative embodiment.

In some alternative embodiments, the apparatus does not need a plurality of output switches 434-1 to 434-N and/or a plurality of charging switches 432-1 to 432-N. FIG. 14 shows a simplified diagram of an example. As shown, the apparatus 100 comprises a charging switch 472 having one input terminal 474 electrically connecting to a power source such as the solar panel 304, a plurality of output terminals 476-1 to 476-N electrically connecting to battery components 210-1 to 210-N, respectively, and an "empty" output terminal 476-0 not connecting to any component. The charging switch 472 may connect the input terminal 474 to any of the output terminals 476-0 to 476-N.

The apparatus 100 also comprises an output switch 478 having one output terminal 482 electrically connecting to a load 442, a plurality of input terminals 480-1 to 480-N electrically connecting to battery components 210-1 to 210-N, respectively, and an "empty" input terminal 480-0 not connecting to any component. The output switch 478 may connect the output terminal 482 to any of the input terminals 480-0 to 480-N.

The control unit 212 controls the charging switch 472 to sequentially or alternately connecting the power source 304 to the battery components 210-1 to 210-N to alternately charge each of the battery components. The control unit 212 also controls the output switch 478 to alternately connecting the battery components 210-1 to 210-N to the load 442 to alternately output power from each of the battery components to the load. Similar to the description above, the battery components 210-1 to 210-N may be charged and output power at the same time. Alternatively, the battery components 210-1 to 210-N may be charged and output power in an asynchronous manner. The control unit 212 may connect the input terminal 474 of the charging switch 472 to the "empty" output terminal 476-0 thereof to disable charging any of the battery components 210-1 to 210-N. The control unit 212 may also connect the output terminal 482 of the output switch 478 to the "empty" input terminal 480-0 thereof to disable outputting power from any of the battery components 210-1 to 210-N.

In above embodiments, a solar panel is used as a power source for charging the battery components. In some alternative embodiments, other power sources, such as wind turbine(s), one or more supply batteries, or the like, may be used for charging the battery components.

In an alternative embodiment, the apparatus 100 does not comprise a power source. Rather, it comprises an electrical connector for connecting the apparatus 100 to an external power source.

Although embodiments have been described above with reference to the accompanying drawings, those of skill in the art will appreciate that variations and modifications may be made without departing from the scope thereof as defined by the appended claims.

What is claimed is:

1. An apparatus for providing electrical power supply via a power output interface, comprising:
   a plurality of rechargeable battery components;
   a housing having a plurality of walls; and
   a control unit received in the housing and electrically coupled to the plurality of rechargeable battery components, the power output interface, and a power source, the control unit further comprising an orientation sensor for detecting the orientation of said housing;
   wherein during operation, the control unit individually and according to a predefined first order switches each of the plurality of rechargeable battery components to the power output interface for a predefined first period of time to output electrical power to a load through a first switch such that, at any time, at most one battery component outputs electrical power via the power output interface;
   wherein during operation, the control unit individually and according to a predefined second order switches each of the plurality of rechargeable battery components to the power source through a second switch for a predefined second period of time to charge said rechargeable battery component such that, at any time, at most one battery component is charged by the power source;
   wherein at least one of the plurality of rechargeable battery components, in at least one period of time during operation, only outputs power or is charged; and
   wherein the control unit uses the information of the detected orientation of the housing for enabling said power outputting and battery component charging if the detected orientation is a predefined first orientation, wherein said first orientation is an orientation in which a first wall of the housing is facing downwardly within a predefined first inclination angle.

2. The apparatus of claim 1 wherein said first period of time is different to said second period of time.

3. The apparatus of claim 1 wherein said first period of time equals to said second period of time.

4. The apparatus of claim 1 wherein each battery component comprises one or more battery cells, said one or more battery cells of each battery component outputting power and being charged as a group.

5. The apparatus of claim 1 wherein the control unit further uses the information of the detected orientation of the housing for
   disabling the plurality of rechargeable battery components from outputting power and disabling the power source from charging any battery if the detected orientation is not the first orientation.

6. The apparatus of claim 5 wherein said control unit further uses the information of the detected orientation of the housing for
enabling indication of the status of the plurality of rechargeable battery components if the detected orientation is a predefined second orientation; wherein said second orientation is an orientation in which a second wall of the housing is facing downwardly within a predefined second inclination angle.

7. The apparatus of claim 1 wherein said plurality of rechargeable battery components are Lithium ion (Li-ion) batteries, Nickel Cadmium (NiCd) batteries, Nickel Metal hydride (NiMH) batteries, Lithium ion polymer (Li-ion polymer) batteries, or a combination thereof.

8. The apparatus of claim 1 wherein the power source comprises at least one solar panel segment, each of said at least one solar panel segment being coupled to an exterior surface of the housing.

9. The apparatus of claim 1 wherein said first order is the same as said second order.

10. A method for providing electrical power supply from two or more rechargeable battery components to a load, comprising:
a power-outputting step comprising: individually and according to a predefined first order, switching each of the two or more rechargeable battery components to the load through a first switch for a predefined first period of time to output electrical power to the load, such that, at any time, at most one battery component outputs electrical power to the load;
a battery-charging step comprising: individually and according to a predefined second order, switching each of the two or more rechargeable battery components to a power source through a second switch for a predefined second period of time to charge said rechargeable battery component, such that, at any time, the power source charges at most one battery component, wherein for at least one of the two or more rechargeable battery components, charging of the battery component using the power source for the predetermined second period of time is conducted while the battery component is not outputting power; and
an orientation-based step comprising: detecting the orientation of a housing, and using the information of the detected orientation of the housing for enabling said power-outputting step and battery-charging step if the detected orientation is a predefined first orientation, wherein said first orientation is an orientation in which a first wall of the housing is facing downwardly within a predefined first inclination angle.

11. The method of claim 10 wherein said first period of time is different to said second period of time.

12. The method of claim 10 wherein said first period of time equals to said second period of time.

13. The method of claim 10 wherein each battery component comprises one or more battery cells, said one or more battery cells of each battery component outputting power and being charged as a group.

14. The method of claim 10 further comprising:
disabling the power-outputting step and the battery-charging step if the detected orientation is not the first orientation.

15. The method of claim 14 further comprising:
enabling indication of the status of the rechargeable battery components if the detected orientation is a predefined second orientation.

16. The method of claim 10 wherein said first order is the same as said second order.

* * * * *